United States Patent [19]

Elton et al.

[11] Patent Number: 5,257,853
[45] Date of Patent: Nov. 2, 1993

[54] HEADREST ARMATURE FOR SEATS

[75] Inventors: Robert D. Elton, Ann Arbor; Mark J. Symonik, Ypsilanti, both of Mich.

[73] Assignee: Hoover Universal, Inc., Plymouth, Mich.

[21] Appl. No.: 832,803

[22] Filed: Feb. 7, 1992

[51] Int. Cl.$^5$ .............................................. A47C 7/36
[52] U.S. Cl. ................................ 297/391; 297/DIG. 2
[58] Field of Search ............... 297/391, 408, 409, 410, 297/396, 397, DIG. 2

[56] References Cited

U.S. PATENT DOCUMENTS

| | | | |
|---|---|---|---|
| 3,480,976 | 12/1969 | Yavner | 297/391 X |
| 4,003,599 | 1/1977 | Takamatsu | 297/391 X |
| 4,191,422 | 3/1980 | Inasawa et al. | 297/391 |
| 4,191,423 | 3/1980 | Goldner | 297/408 |
| 4,256,341 | 3/1981 | Goldner et al. | 297/410 |
| 4,353,595 | 10/1982 | Kaneko et al. | 297/408 |
| 4,540,217 | 9/1985 | Suzuki | 297/391 |
| 4,673,214 | 6/1987 | Meiller | 297/408 |
| 4,733,913 | 3/1988 | Tateyama | 297/409 |
| 4,858,994 | 8/1989 | Yamashita | 297/391 |

FOREIGN PATENT DOCUMENTS 2164248 3/1986 United Kingdom ................ 297/408

Primary Examiner—Kenneth J. Dorner
Assistant Examiner—Milton Nelson, Jr.

[57] ABSTRACT

A one piece plastic molded hollow armature is shown for a vehicle seat headrest which is formed with two halves. Each half is formed with a wall having a concave inner surface and corresponding convex outer surface and a peripheral edge. At a linear portion of the edges of each half, the halves are joined together by a flexible web forming a hinge. The two halves are rotated about a flexible web to close the armature upon a headrest support post and are sealed together in the closed position. Afterwhich, a foam padding is molded around the armature through a pour in place molding operation and covered with an upholstery member. A plurality of posts extend from one armature half through apertures in the other half. Once the armature is closed, it is permanently sealed by heat staking the posts to form enlarged rivet heads.

14 Claims, 2 Drawing Sheets

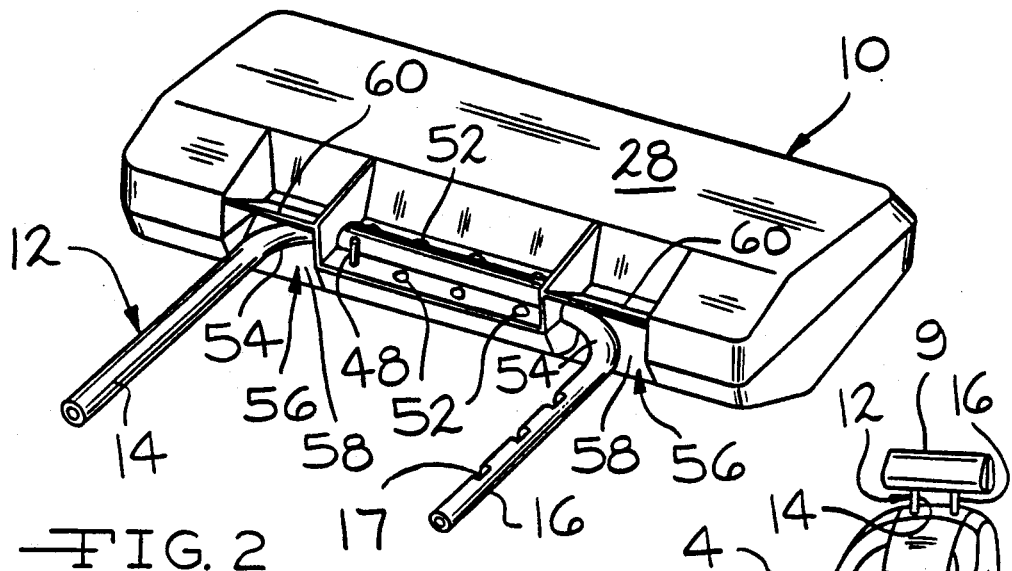
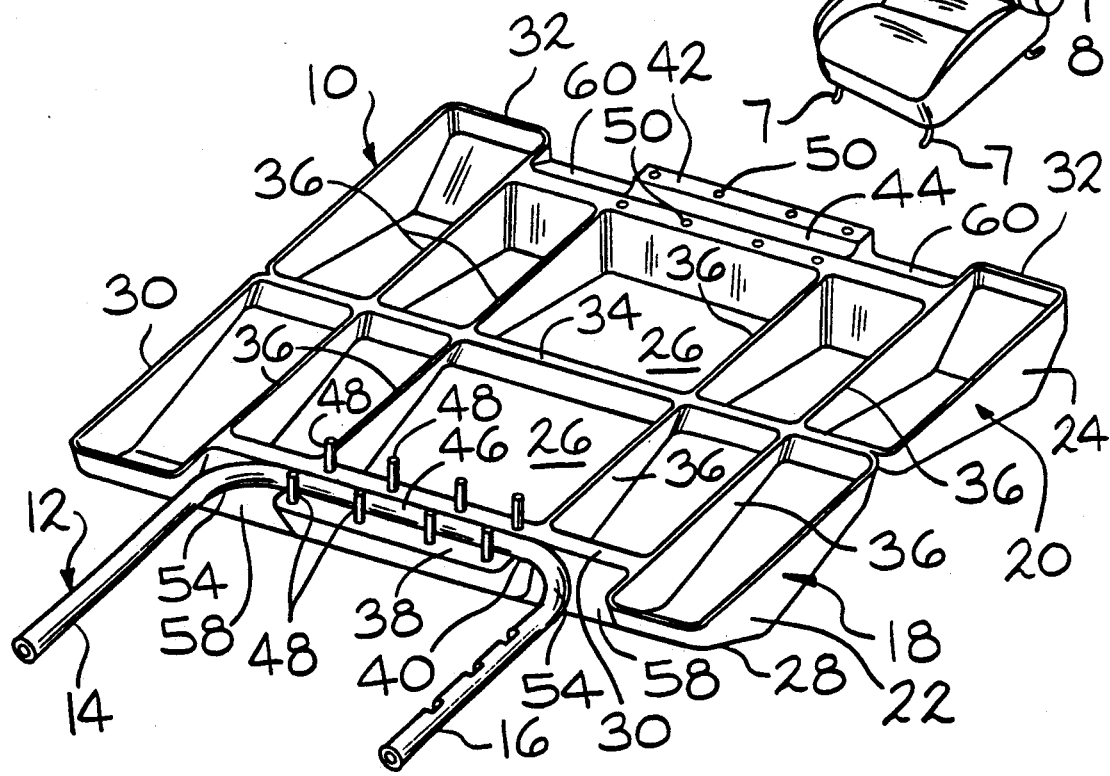

HEADREST ARMATURE FOR SEATS

BACKGROUND AND SUMMARY OF THE INVENTION

The present invention relates to an armature for a seat back headrest and in particular to a one piece hollow armature made of molded plastic.

The headrest for a seat assembly, and in particular an automotive vehicle seat assembly, is typically made of an upholstered foam pad surrounding a supporting frame. The frame is in turn carried by one or two support legs that extend downwardly into the seat back of the vehicle seat assembly. Numerous designs have been developed for headrest frames and for attaching the frames to support legs.

In one design for a headrest, the headrest frame is made of a metallic plate and is attached to the support legs by clamps and other hardware. Some of the attachments are rigid without any relative motion. Others are adjustable to vary the inclination of the headrest by rotating the headrest body about a laterally extending horizontal axis usually formed by an upper portion of the headrest support legs. The adjustment is provided by using a clamp or J-strap having a bearing portion surrounding a horizontal journal portion of the support legs. The clamps or straps, are attached at both ends to the headrest frame with the friction between the clamp and support legs holding the headrest in its inclined positions. Several variations of this basic concept have been developed.

To form an attractively shaped headrest pad around a flat plate, more foam is used than needed to provide sufficient adding for a seat occupant. To reduce the amount of foam used, some headrests are designed with a hollow frame with the inclination adjustment mechanism contained inside the hollow body. A more complex adjustment mechanism is typically used in such a case. The hollow headrest frames are generally of two piece construction and are joined together after assembly of the internal adjustment mechanism. Once the hollow frame is assembled, the foam pad is molded around the frame.

A disadvantage of the various headrest configurations is the numerous individual components that are necessary for assembling the frame and for mounting the frame to the support legs, especially when angular adjustability is provided. Specially designed hardware is often to assembly and mount the frame.

The common feature found in most if not all headrest assemblies is the ability to vertically adjust the position of the headrest relative to the seat back. One common means for providing vertical adjustment is contained in the seat back. The structure for attaching the support legs of the headrest to the seat back allows for the support legs to be withdrawn from the seat back or to be inserted further into the seat back to raise or lower the headrest. The support legs are generally equipped with engagement features such as detents to hold the support legs in place in the seat back.

It is an object of the present invention to provide a headrest frame that is mounted to the headrest support post without specially made custom components or hardware for both fixed and adjustable headrests.

It is an advantage of the present invention that the headrest frame is a one piece plastic molding that once molded can be easily assembled around the headrest support post and fastened thereto without separate fasteners.

The headrest frame of the present invention comprises a single piece injection molded plastic armature having a pair of halves. Each half comprises a wall that has an essentially concave inner surface and an essentially convex outer surface with a peripheral edge of each wall. A portion of the peripheral edge of each half is linear, and along this linear portion the two halves are joined together by a flexible plastic web. The web serves as a hinge when the two halves of the armature are folded together. The peripheries of the two halves are symmetrical about the axis of the hinge so that when the two halves of the armature are folded together, the result is an essentially continuous solid surface.

The armature is closed by rotating the two halves about the flexible web until the peripheral edges of the two halves engage one another forming a closed hollow body, the exterior of which is formed by the outer convex surfaces of the two half portions. Mounting bosses within each half of the armature form bearing surfaces that engage the support legs of the headrest. In one embodiment, the bearing surfaces of the armature halves engage a laterally extending horizontal portion of the headrest support legs to enable rotational adjustment of the headrest angle.

One half of the armature includes posts that extend through apertures in the opposite armature half when closed. After closing, the posts are headed by a heat staking operation forming enlarged heads, like a rivet, to hold the armature closed. A foam pad is molded around the armature utilizing a pour in place process with an upholstery cover applied over the molded foam.

Alternatively, other fasteners can be used, such as bolts, rivets, self tapping screws, etc. Such fasteners are standard, off-the-shelf components that do not need to be custom designed.

Further objects, features and advantages of the invention will become apparent from a consideration of the following description and the appended claims when taken in connection with the accompanying claims.

BRIEF DESCRIPTION OF THE DRAWINGS

FIG. 1 is a perspective view of a typical vehicle seat assembly containing a headrest with an armature of the present invention;

FIG. 2 is a perspective view showing the headrest armature of the present invention closed upon a headrest support post;

FIG. 3 is a perspective view of the armature shown in FIG. 1 in an position;

DETAILED DESCRIPTION OF THE INVENTION

Figure 4:
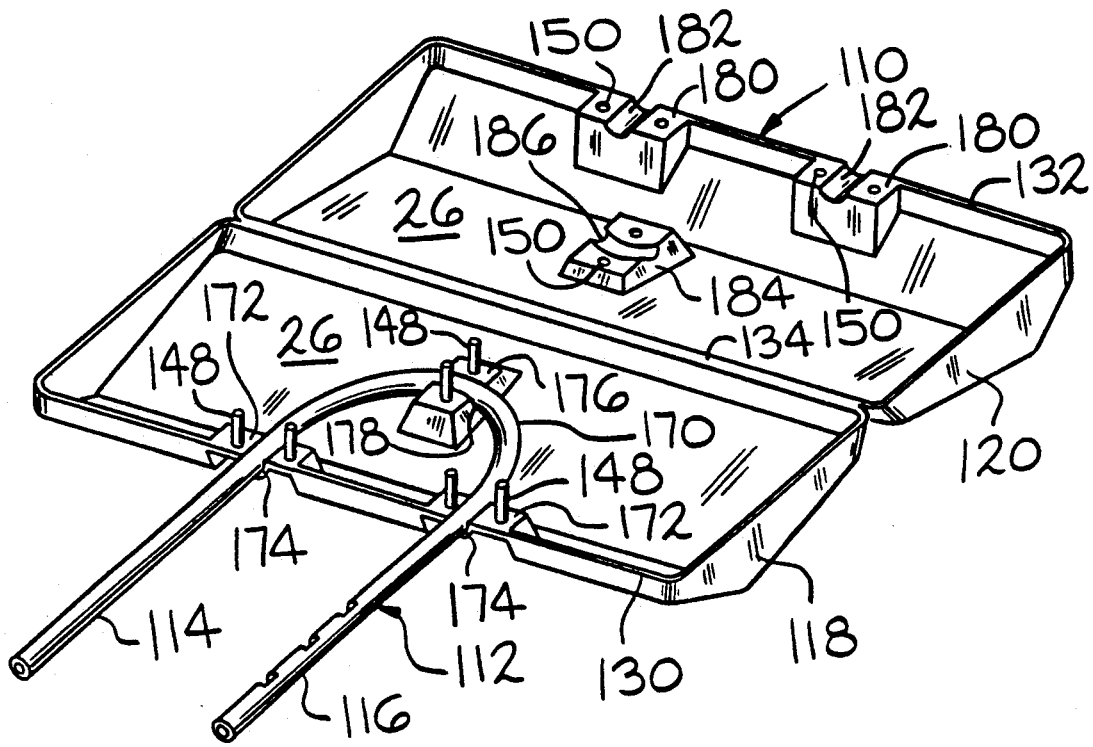
FIG. 4 is a perspective view like FIG. 2 of an alternative embodiment of the headrest armature of the present invention.

The seat assembly 4 shown in FIG. 1 is a typical vehicle seat assembly and includes a seat cushion 6, mounting feet 7 and seat back 8. A head rest 9, including the armature of the present invention is mounted to the seat back by headrest support post 12 containing legs 14 and 16 inserted into the seat back 8.

The headrest armature of the present invention is shown in a closed position in FIG. 2 and designated generally at 10. Headrest armature 10 has been closed upon a headrest support post 12 having a pair of legs 14 and 16 extending from the armature 10. The legs of the support post are to be inserted into a seat back of a seat assembly in a conventional manner. Detents 17 in leg 16 are used by the headrest mount in the seat back to hold the support post and headrest in place.

Armature 10 is shown in FIG. 3 in an open position illustrating the armature as an single piece molded plastic member. The armature is composed of two halves 18 and 20. Each of the halves 18, 20 are formed by a wall 22, 24. The walls form a concave inner surface 26 and a convex outer surface 28 relative to their respective peripheral edges 30, 32. A portion of the peripheral edges of each of the halves is linear and the halves are joined along the linear portion by a flexible plastic web 34. The flexible web 34 forms a hinge having a longitudinal axis of rotation parallel to the linear peripheral edge portions joined by web 34.

The inner side of each of the halves are reinforced by a series of ribs 36 that project between the concave inner surface 26 of the walls 22, 24. The armature is closed by rotating the two halves 18, 20 about the flexible web hinge 34 until the peripheral edge 30 of half 18 contacts the peripheral edge 32 of half 20. The result is a hollow body having an exterior comprised from the convex outer surfaces 28 of the two halves 18 and 20. The peripheral edges of the two halves are generally symmetric about the axis of the flexible web hinge 34 such that the peripheral edges of the two halves will match upon rotation to the closed position of FIG. 1.

As shown in FIG. 3, the armature half 18 is formed with a mounting boss 38 having a semi-cylindrical recess 40 formed therein extending over a longitudinal extent. The armature half 20 has a corresponding mounting boss 42 with a semi-cylindrical recess 44 extending over the same longitudinal length. The support post 12 is generally U-shaped having a crossbar 46 extending between the two legs 14 and 16 and generally perpendicular thereto. The cross bar 46 is positioned in one of the semi-cylindrical recesses 40 or 44 prior to the complete closure of the armature 10. Upon closing, the semi-cylindrical recess of the other armature half engages the exposed portion of the crossbar 46. The crossbar 46 forms a journal and the two semi-cylindrical recesses 40, 44 form bearing surfaces for the journal. The bearing is sized such that upon sealing of the armature in the closed position sufficient friction will exist between journal and bearing that the headrest will stay in the position in which it is placed, but can be rotated about the crossbar with the application of reasonable force to the headrest. The amount of friction can be controlled by the material of the armature and crossbar, the surface finish of the crossbar, the closure force of the armature and the size of the recesses 40, 44.

The mounting boss 38 contains a plurality of posts 48 which project out of the mounting boss in a direction away from the recess 40. When the armature is closed, the posts 48 extend through apertures 50 in the mounting boss 42 of the armature half 20. One post 48 is shown in FIG. 1 projecting through an aperture 50. The remaining posts 48 have been headed in a heat staking operation to form an enlarged head 52 (like a rivet) on the outer surface of the armature half 20. This secures the armature in the closed position. The headrest armature is thus assembled to the support post without the use of any separate fastening hardware. In the embodiment shown, the completed assembly consists of no components other than the U-shaped support post and the one piece molded plastic armature. In the embodiment of FIG. 3, the posts 48 project from a portion of the peripheral edge that is opposite from the flexible web 34.

The support post 12 includes two bend portions 54 connecting the two ends of the crossbar 46 to the legs 14 and 16. These bend portions 54 are contained within cavities 56 formed along the bottom of the headrest armature. The cavities 56 are defined by ribs 58 in the two armature halves 18 and 20. In the closed position, the ribs 58 and 60 from the opposite armature halves are inclined relative to one another to form the walls of cavities 56. The angle separating the ribs 58 and 60 defines the angular extent of rotation of the headrest about the crossbar 46. The rotation of the headrest armature is limited by contact between the ribs 58 and 60 with the bend portions 54 in the support post. During a rear impact collision, the head of a seat occupant will contact the headrest and rotate the headrest to its rearwardmost position at which the support post contacts rib 58 preventing further travel of the headrest.

Figure 5:
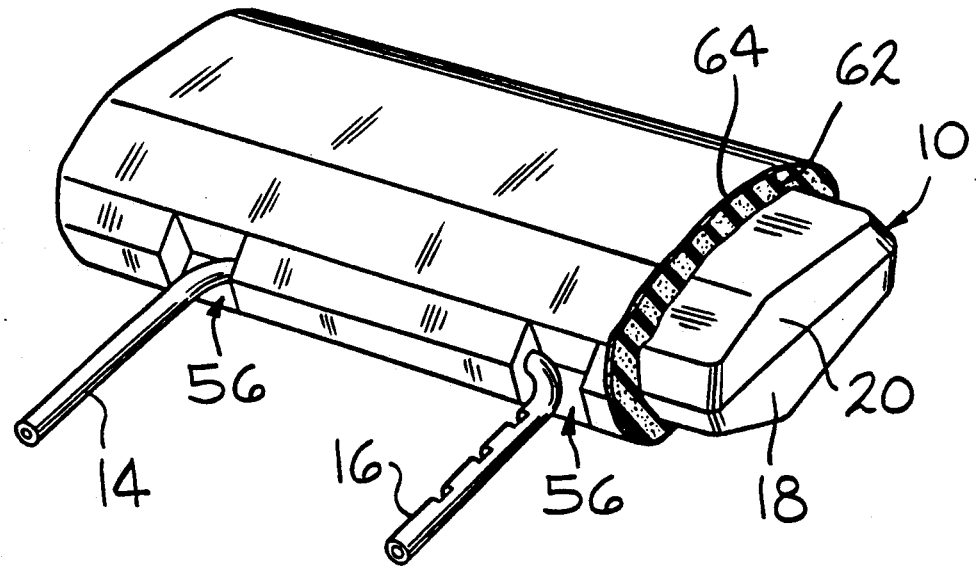
FIG. 5 is a fragmentary perspective view of a completed headrest showing a foam pad molded around the armature with an upholstery cover.

The headrest armature 10 is thus a simply produced one piece plastic molding that is closed upon the headrest support post to mount the armature to the support post and also to provide rotational adjustment of the armature relative to the post. This construction eliminates the need for additional hardware, for the mounting of the armature, and for providing adjustability. By molding the armature as a single plastic piece that is flexible rather than two separate pieces, the assembly is simplified compared to hollow armatures made of two separate pieces. With separate pieces, two components must be molded and inventoried. When assembled, the two separate pieces must be guided together and joined at their peripheries. The two halves of the one piece molded armature, when the two halves are closed together, naturally align since the halves are joined together. The completed headrest is shown in FIG. 5 with a portion broken away to illustrate the foam padding 62 that is molded around the armature 10 via a pour in place process and covered with an upholstery cover 64.

An alternative embodiment of the headrest armature of the present invention is shown in FIG. 4 in which similar components are given similar reference numerals with the addition of 100. Headrest armature 110 differs from armature 10 in that the armature is not rotatable relative to the support post 112 but is fixed in a single angular position. Instead of having a linear cross bar between the legs 114 and 116 of the support posts a semi-circular center portion 170 joins the two legs. The armature half 118 is formed with a pair of mounting bosses 172 along the peripheral edge 130 which include semi-cylindrical recesses 174 perpendicular to the peripheral edge and into which are seated the legs 114 and 116 of the support post 112. A third mounting boss 176 is positioned in the center portion of the armature half 118 and includes a semi-cylindrical recess 178 that is generally arcuate about its longitudinal axis to receive a portion of the curved center portion 170 the headrest post 112.

The armature half 120 includes a pair of mounting bosses 180 with semi-cylindrical recesses 182 corresponding to the cylindrical recesses 174 and the mounting bosses of the armature half 118. The armature half 120 also includes a center mounting boss 184 with a curved semi-cylindrical recess 186 corresponding to the mounting boss 176 of armature half 118. Because the bearing surfaces of the recesses 174, 178, 182, and 186 do not have a common linear axis, the armature 110 will not rotate about the support post 112.

The mounting bosses in the armature half 118 include posts 148 projecting outwardly therefrom which are inserted into the apertures 150 in the mounting blocks of armature half 120. Once the armature is closed, the posts 148 are heat staked to close the armature.

To further reduce the weight of the completed headrest assembly, the headrest support posts 12 and 112, can be made of a hollow tube as shown rather than a solid rod as is typically the case. The radius of the bends 54 in the support post 12 are preferably at least three times the diameter of the cross section of the headrest support post 12.

The one piece armature of the present invention achieves the objective of the present invention by simplifying the mounting of the headrest armature to the headrest support post. The bearing surface formed by the armature fits about a bearing portion of the headrest support post to enable the headrest angle to be adjusted. No mounting hardware is needed since the armature includes rivet posts to hold the armature closed upon the support post.

It is to be understood that the invention is not limited to the exact construction illustrated and described above, but that various changes and modifications may be made without departing from the spirit and scope of the invention as defined in the following claims.

We claim:

1. A headrest assembly for a seat assembly having a seat back comprising:
   a headrest support post having at least one extending leg for insertion into said seat back;
   an armature mounted to said support post, said armature including a molded plastic body having first and second half portions, each half portion being formed by a wall having a concave inner surface and a convex outer surface and each wall having a peripheral edge relative to which said inner surface is concave and said outer surface is convex, a portion of said peripheral edge of said wall of each half portion being linear and said half portions being joined together along said linear edge portion by a flexible web of plastic defining an axis of rotation;
   the peripheral edges of said half portions of said armature being symmetric about said axis whereby rotation of said half portions about said axis of rotation in a direction to engage the peripheral edges of said walls of said two half portions forms a closed hollow body, the exterior of which is formed by the convex outer surface of said wall of each said two half portions;
   a foam pad molded around said closed hollow body formed by said armature; and
   an upholstery cover surrounding said foam pad.

2. The headrest assembly of claim 1 further comprising mounting means disposed on said concave inner surface of both said half portions forming a plurality of recessed surfaces for engagement with a headrest support post when said half portions are rotated about said axis to form said closed hollow body, said recesses surfaces defining separate longitudinal axes whereby said armature is not rotatable about said headrest support post.

3. The headrest assembly of claim 1 further comprising stiffening ribs within each of said half portions extending from said concave inner surfaces.

4. The headrest assembly of claim 1 wherein said half portions of said armature include coupling means for fastening said half portions together when said half portions have been rotated about said axis to form said closed hollow body.

5. The headrest assembly of claim 2 wherein said coupling means includes post projecting from one of said half portions having distal ends which extend through apertures in the other of said half portions when said half portions are rotated about said axis to form said closed hollow body and wherein said distal ends of said posts extending through said other half portion are enlarged to form rivet heads to maintain said armature in a closed position.

6. The headrest assembly of claim 5 wherein said posts are disposed along a portion of the peripheral edge of said one half portion generally opposite from said flexible web joining said two half portions.

7. The headrest assembly of claim 1 further comprising mounting means disposed on said concave inner surface of both said half portions forming recessed surfaces for engaging said headrest support post when said half portions are rotated about said axis to form said closed hollow body.

8. The headrest assembly of claim 7 further comprising coupling means for fastening said half portions together when said half portions have been rotated about said axis to form said closed hollow body said coupling means including posts projecting from one of said half portions adjacent to said recessed engaging surfaces and having distal ends which extend through apertures in the other of said half portions when said half portions are rotated about said axis to form said closed hollow body and wherein said distal ends of said posts extending through said other half portion are enlarged to form rivet heads to maintain said armature in a closed position.

9. The headrest assembly of claim 7 wherein said recessed surfaces for engaging said headrest support post include in each half portion a single semi-cylindrical recess for frictional engagement with a cylindrical portion of said headrest support post extending laterally above a seat back whereby upon the application of sufficient force said armature is rotatable about said cylindrical portion of said headrest support post.

10. The headrest assembly of claim 9 further comprising means adjacent to each end of said semi-cylindrical recess for forming a cavity in the exterior of said closed hollow body through which a headrest support post extends, said cavities having fore and aft walls inclined relative to one another and engagable with said headrest support post to limit rotation of said headrest armature relative to said headrest support post.

11. A headrest assembly for mounting to a seat back comprising:
    a headrest support post having a pair of legs insertable into a seat back;
    an armature mounted to said support post, said armature being a molded plastic body having first and second half portions, each half portion being formed by a wall having a concave inner surface and a convex outer surface, a peripheral edge of each wall relative to which said inner surface is concave and said outer surface is convex, a portion of said peripheral edge of said wall of each half portion being linear and said half portions being joined together along said linear edge portion by a flexible web of plastic defining a first axis of rotation;

the peripheral edges of said half portions being symmetric about said first axis whereby rotation of said half portions, about said first axis of rotation to a closed position in which the peripheral edges of said walls of said two half portions engage one another, forms a closed hollow body, the exterior of which is formed by the outer convex surface of said wall of each said two half portions;

each of said half portions formed with coupling means for fastening said half portions together when said half portions have been rotated about said axis to form said closed hollow body;

means for mounting said armature to said support post including on each half portion a recessed engagement surface, said engagement surfaces frictionally engaging a portion of said support post when said armature half portions are moved to said closed position to mount said armature to said support post;

a foam pad molded around said closed hollow body formed by said armature; and an upholstery cover surrounding said foam pad.

12. The headrest assembly of claim 11 wherein said portion of said headrest support post engaged by said armature engagement surfaces is cylindrical and extends laterally above a seat back when mounted to a seat back and said engagement surfaces each forming a semi-cylindrical recess for engagement with said cylindrical portion of said support post forming a second axis of rotation about which said armature is rotatable.

13. The headrest assembly of claim 11 wherein each half portion of said armature includes a plurality of recessed engagement surfaces for engagement with said support post, said plurality of engagement surfaces each defining separate axes whereby rotation of said armature relative to said support post is prevented.

14. The headrest assembly of claim 11 wherein said headrest support post is a hollow tube.

* * * * *

UNITED STATES PATENT AND TRADEMARK OFFICE
CERTIFICATE OF CORRECTION

PATENT NO. : 5,257,853
DATED : November 2, 1993
INVENTOR(S) : Robert D. Elton, Mark J. Symonik It is certified that error appears in the above-indentified patent and that said Letters Patent is hereby corrected as shown below:

In Column 1, line 35, after sufficient, delete "adding" and insert --padding--.

In Column 1, line 50, after "often", insert --used--.

In Column 2, line 10, Claim 5, after includes, delete "post" and insert --posts--.

Signed and Sealed this

Seventh Day of June, 1994

BRUCE LEHMAN

Attest:

Attesting Officer

Commissioner of Patents and Trademarks